United States Patent
Pizzuto et al.

(10) Patent No.: US 8,842,966 B2
(45) Date of Patent: Sep. 23, 2014

(54) APPARATUS AND METHOD FOR RECORDING MEDICAL IMAGE DATA WITH EMBEDDED VIEWER IN REMOVABLE STORAGE MEDIA

(71) Applicant: Virtual Imaging, Inc., Deerfield Beach, FL (US)

(72) Inventors: Carmine Pizzuto, Boca Raton, FL (US); Peter M. Chicchetti, Coral Springs, FL (US)

(73) Assignee: Virtual Imaging, Inc., Boca Raton, FL (US)

( * ) Notice: Subject to any disclaimer, the term of this patent is extended or adjusted under 35 U.S.C. 154(b) by 0 days.

(21) Appl. No.: 13/680,981

(22) Filed: Nov. 19, 2012

(65) Prior Publication Data

US 2013/0129306 A1  May 23, 2013

Related U.S. Application Data (60) Provisional application No. 61/562,910, filed on Nov. 22, 2011.

(51) Int. Cl.
| | |
|---|---|
| H04N 5/765 | (2006.01) |
| H04N 9/80 | (2006.01) |
| G06K 9/00 | (2006.01) |
| H04N 5/77 | (2006.01) |

(52) U.S. Cl.
USPC ........... 386/231; 386/239; 386/248; 386/362; 382/128

(58) Field of Classification Search
USPC ................... 386/231, 239, 248, 362; 382/128
See application file for complete search history.

(56) References Cited

U.S. PATENT DOCUMENTS

| | | | |
|---|---|---|---|
| 6,678,764 B2 | 1/2004 | Parvulescu et al. | |
| 6,954,802 B2 | 10/2005 | Sutherland et al. | |
| 7,801,422 B2 | 9/2010 | Wright et al. | |
| 8,041,093 B2 | 10/2011 | Omernick et al. | |
| 2002/0156650 A1* | 10/2002 | Klein et al. | 705/2 |
| 2006/0149601 A1 | 7/2006 | Langhofer et al. | |
| 2007/0086632 A1* | 4/2007 | Ramraj et al. | 382/128 |
| 2009/0296540 A1* | 12/2009 | Gilbert et al. | 369/30.23 |
| 2012/0163769 A1 | 6/2012 | Wright et al. | |

OTHER PUBLICATIONS

Revet, Bas, "DICOM Cook Book for Implementations in Modalities", Architecture Re-Use Communications, Jan. 14, 1997, pp. 1-57, Chapters 1 and 2, Version 1.1 (Accepted).

(Continued)

*Primary Examiner* — Daquan Zhao (74) *Attorney, Agent, or Firm* — Canon USA Inc. IP Division (57) ABSTRACT

An apparatus configured to record data onto removable storage media, includes: an image receiving interface configured to receive imaging data from an imaging modality, a central processing unit configured to process the image data to generate a study in a standard medical imaging format, and a removable media interface built-in or attached-to the modality and configured to, in response to receiving the study from the central processing unit, automatically start an storage operation to record at least part of the study generated by the central processing unit onto the removable storage media. In one embodiment, the removable media interface receives the study via a localhost address without the use of a physical network between the modality and removable media interface.

20 Claims, 7 Drawing Sheets (56) References Cited

OTHER PUBLICATIONS

Nema, "Digital Imaging and Communications in Medicine (DICOM) Part 2: Conformance", (2003), pp. 1-50, Published by National Electrical Manufacturers Association (NEMA), Rosslyn/Virginia/USA.

Sound-Eklin, "A Step-by-Step Guide to Burn a CD in eFilm", www.soundeklin.com, (publication date unknown), 2 pages.

Horii, M.D., Steven C., "Part Four: A Nontechnical Introduction to DICOM", RadioGraphics, (Sep.-Oct. 1997), pp. 1297-1309, vol. 17 No. 5.

PACSGEAR, "MDR Express RP" product brochure, PACSGEAR, Pleasanton/CA/USA, (2010), 2 pages.

Universal Unltrasound, "MyLab Ultrasound", MyLab Series, (2009), Universal Ultrasound A Division of UMS Solutions, Inc. Bedford Hills/New Jersey/USA, 16 Pages.

<http://solutionsmi.com/tims/>, MED iMAGE Equipment Solutions, "TIMS, the PACS Connectivity Solution" (Jan. 22, 2014), p. 1-2.

Foresight Imaging, LLC., "TIMS DICOM System", (2007), pp. 1-4, <www.tims.com>.

\* cited by examiner

APPARATUS AND METHOD FOR RECORDING MEDICAL IMAGE DATA WITH EMBEDDED VIEWER IN REMOVABLE STORAGE MEDIA

CROSS REFERENCE TO RELATED APPLICATIONS

This application claims priority from Provisional Application No. 61/562,910 filed Nov. 22, 2011, the disclosure of which is hereby incorporated by reference herein in its entirety.

FIELD

The disclosure of this application relates generally to an apparatus and method for recording medical image data directly from an imaging modality onto portable storage media.

BACKGROUND

In the medical field, DICOM (Digital Imaging and Communications in Medicine) is the industry standard for formatting, transferring, storing and viewing any kind of medical image and other medical information in digital format. Based on the Open System Interconnection (OSI) model of the International Standards Organization (ISO), DICOM enables digital communication between diagnostic and therapeutic equipment and systems from various manufacturers. Specifically, DICOM enables the integration of scanners, servers, workstations, printers, and network hardware from multiple manufacturers into a picture archiving and communication system (PACS). The communication protocol is an application protocol that uses TCP/IP to communicate between systems. DICOM files can be exchanged between two entities that are capable of receiving image and patient data in DICOM format. Thus, DICOM is a global information-technology (IT) standard designed to ensure interoperability of systems used to generate, transfer, store, process, query, retrieve, view or print medical images and documents related thereto.

Medical images stored in DICOM format and reports related thereto are transmitted digitally via PACS. The universal format for PACS image storage and transfer is DICOM. Non-image data, such as scanned documents, may be incorporated into PACS using consumer industry standard formats like PDF (Portable Document Format), after these documents are encapsulated in DICOM formal. A PACS system consists of the following main components: (i) an imaging modality such as X-ray radiographic apparatus, a magnetic resonance imaging (MRI) system, or the like; (ii) a secured network (typically TCP/IP network, e.g., Ethernet®) for transmission of patient image data and related information; (iii) workstations for interpreting and reviewing the images, (iv) archiving databases for the storage and retrieval of images and reports; and (v) workstations for providing access to the databases and making the data available to final users.

Figure 7:
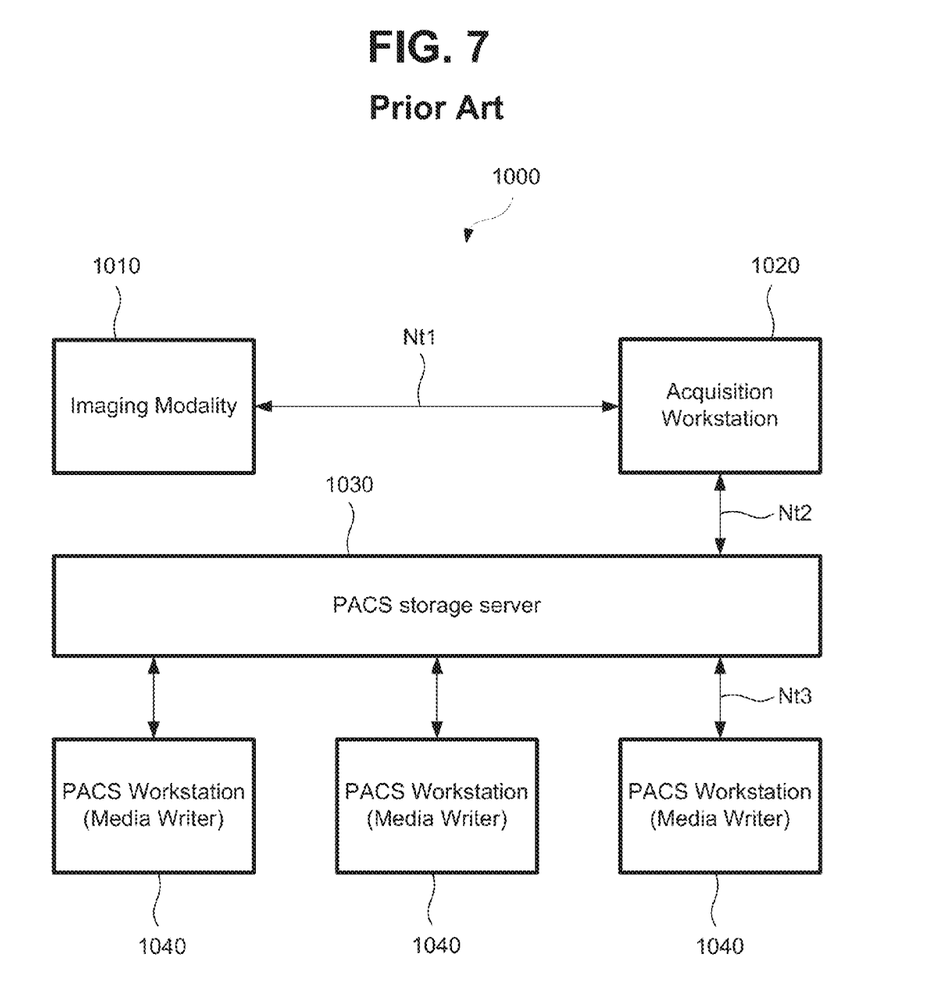
FIG. 7 illustrates a conventional Picture Archiving and Communication System (PACS) system.

FIG. 7 illustrates an example of a conventional PACS system 1000. In FIG. 7, the PACS system 1000 includes an imaging modality 1010, an acquisition workstation 1020, a PACS storage server 1030, and one or more access workstations 1040 interconnected by a plurality of networks Nt1, Nt2 and Nt3. In the conventional PACS system 1000, images of a patient's anatomy acquired by the imaging modality 1010 and information related thereto are transmitted electronically over a first wired or wireless network Nt1 to an acquisition workstation 1020. Several acquisition workstations 1020 can be used, and these forward the acquired images, via a second wired or wireless network Nt2, to the PACS storage server 1030 for archiving. To use the archived images, a user can access any one of a plurality of workstations 1040 via an additional wired or wireless network Nt3. As used herein, a wired or wireless network refers to a physical wired or wireless communication channel that interconnects data processing devices for the purpose of data exchange. In that sense, a network is considered a medium or channel to establish a "physical connection" between two end devices (typically computers). Examples of a network include a local area network (LAN), a wide area network (WAN), the World Wide Web (WWW), and the like.

It is evident, therefore, that combined with advance networking technology and the Internet, a PACS system has the ability to provide timely and efficient access to medical images, medical reports and related data across extensive interconnected networks. Accordingly, PACS and the DICOM standard (protocol and format) are the current "state of the art" technology for production, retrieval, distribution, and display of medical images, as these provide substantial advantages over the conventional distribution of screen-film based images. Not only the digital world of PACS and DICOM offers higher resolution and higher quality images, but it also permits substantially instant access, distribution and analysis of medical images.

Currently, the use of certain medical applications, such as digital radiography (DR), has been expanded beyond the conventional medical environment, such as hospitals and imaging centers, to field-deployable uses in veterinarian, industrial and security imaging. For example, a growing field where digital radiography may be used is explosive ordinance disposal (EOD) for military and law enforcement purposes. Digital radiography is also being increasingly used for field deployable medical purposes in disaster and war zone environments to provide on-site fast and accurate care to disaster victims or wounded military personnel, respectively. In veterinarian imaging, DR equipment is routinely transported for on-site imaging. However, in the industrial, military, law enforcement and veterinarian environments, after acquiring an image, a PACS system or at the very least a DICOM compliant workstation is required to store, view and distribute images. This represents a problem for industrial, military or law enforcement entities, as well as for field-deployable medical applications where the equipment to deal with DICOM formatted images is not readily available. Often these images are acquired in-field remote environments where there is limited or no accessibility to DICOM workstations or PACS systems. Additionally, DICOM workstations and PACS systems are very expensive to deploy and are not practical for transport in the open field.

Although certain solutions for producing medical image data onto recording media have been previously proposed, hitherto it has been unknown of a solution that can provide immediate recording of DICOM formatted images onto removable/portable media directly at the imaging modality. That is, it has been unknown to the inventors herein a modality capable of directly producing DICOM-compliant studies onto removable storage media without the use of a physical network between the modality and an additional computer.

U.S. Pat. No. 7,801,422 to Wright et al., (herein "Wright"), discloses a system that allows for digital medical image data to be produced on a portable digital recording medium such as a compact disc (CD) or a digital versatile disc (DVD). Notably, the method for producing medical image data on the CD includes the steps of connecting a browsing terminal to a computer database configured to store medical image data, selecting medical image data from medical image data stored on the database, and recording the selected medical image data on portable digital recording medium. Accordingly, in the Wright patent, medical image data in DICOM format must first be stored in the computer database using a PACS network, and only then the medical image data can be retrieved (through PACS) from the database and produced on the CD.

Patent application publication US 2006/0149601, by Langhofer et al., (herein "Langhofer") discloses a system and method for recording medical image data onto a digital recording media. Langhofer describes a video capturing device coupled to a medical imaging modality for capturing a plurality of video images from the medical imaging modality and converting the plurality of video images into digital images. A media writer is coupled to the video capturing device for recording the digital images onto a removable media. A computer is coupled to the medical imaging modality interface, the video capturing device and the media writer for controlling operation of the system. Here, medical images are captured by a video device as video images and digitized. The video device is not part of the modality itself, but has to be coupled to the modality. Moreover, a separate computer is coupled to the medical imaging modality interface, the video capturing device and the media writer for controlling operation of the system. Thus, it is seen that Langhofer's system may be a costly implementation not adequate for field-deployable applications.

In consideration of the foregoing background, it is evident that a need remains for a solution to the growing demand of digital radiographic imaging for field-deployable applications, as well as for industrial, military or law enforcement entities. In particular, a need remains for recording DICOM formatted images onto portable media directly within the imaging modality itself so that DICOM formatted images may be utilized in non-DICOM environments.

SUMMARY

In accordance with embodiments described herein, a solution is disclosed that seamlessly resides on the modality and archives DICOM images to CD or DVD without the use of a PACS network. Advantageously, the solution is capable of storing images onto portable digital media when a PACS system is not in place or to produce hard copies of medical images via Windows print. The solution has an embedded DICOM viewer which allows viewing the images from any PC in DICOM format. The DICOM images may then be converted into non-DICOM images, for example, images may be converted to JPEG format for ease of archive, e-mail and print. This solution may be particularly advantageous in field-deployable applications, such as the testing, military, law enforcement and veterinarian industries, where there is limited or no accessibility to DICOM workstations or PACS systems.

In accordance with at least one embodiment of the present invention, the instant disclosure is directed to, among other things, an imaging modality configured to image a subject and to store images of the subject onto removable storage media directly at the modality. The modality includes an image receiving interface configured to obtain images of a subject, a central processing unit configured to process the images of the subject and to generate a DICOM-compliant study, and a removable media interface built in or attached to the modality and configured to, in response to receiving the study from the central processing unit, automatically start a storage operation to record at least part of the study generated by the central processing unit onto removable storage media. In one embodiment, the removable media interface receives the study via a localhost address without the use of a physical network between the modality and removable media interface.

Other modifications and/or advantages of present invention will become readily apparent to those skilled in the art from the following detailed description in reference to the drawings.

DETAILED DESCRIPTION

In the following description, reference is made to the accompanying drawings which are illustrations of embodiments in which the disclosed invention(s) may be practiced. It is to be understood, however, that those skilled in the art may develop other structural and functional modifications without departing from the novelty and scope of the instant disclosure.

In referring to the description, specific details are set forth in order to provide a thorough understanding of the examples disclosed. In other instances, well-known methods, procedures, components and circuits have not been described in detail as not to unnecessarily lengthen the present disclosure. Some embodiments or diagrams of the present invention may be practiced on a computer system that includes, in general, one or a plurality of processors for processing information and instructions, random access (volatile) memory (RAM) for storing information and instructions, read-only (non-volatile) memory (ROM) for storing static information and instructions, a data storage device such as a magnetic or optical disk and disk drive for storing information and instructions, an optional user output device such as a display device (e.g., a monitor) for displaying information to the computer user, an optional user input device including alphanumeric and function keys (e.g., a keyboard) for communicating information and command selections to the processor, and an optional user input device such as a cursor control device (e.g., a mouse) for communicating user input information and command selections to the processor.

As will be appreciated by those skilled in the art, the present examples may be embodied as a system, method or computer program product. Accordingly, some examples may take the form of an entirely hardware embodiment, or an embodiment combining software and hardware aspects that may all generally be referred herein as a "circuit", "module" or "system". Further, some embodiments may take the form of a computer program product embodied in any non-transitory tangible computer-readable medium having computer-usable program code stored therein. For example, some embodiments described below with reference to flowchart illustrations and/or block diagrams of methods, apparatus (systems) and computer program products can be implemented by computer program instructions. The computer program instructions may be stored in computer-readable media that can direct a computer or other programmable data processing apparatus to function in a particular manner, such that the instructions stored in the computer-readable media constitute an article of manufacture including instructions and processes which implement the function/act/step specified in the flowchart and/or block diagram.

As used herein the term "DICOM formatted images" refers to images generated in digital format that conform to current DICOM standards, as adopted by the American College of Radiology (ACR). Accordingly, reference should be made to the DICOM support information and standards available from well known sources, for example, from the National Electrical Manufactures Association (NEMA) in the Internet at address http://medical.nema.org or ACR's website at address http://www.acr.org. As used herein, the terms "removable media" and "portable media" may, at times be interchangeably used, and both are meant to refer to data storage media designed to be removed from a computer without powering the computer off. Examples of removable or portable media include, but are not limited to, optical (CD/DVD), magnetic (tapes), magneto-optic (magneto-optical discs) or ferro-magnetic (memory cards, memory stick) media.

Figure 1:
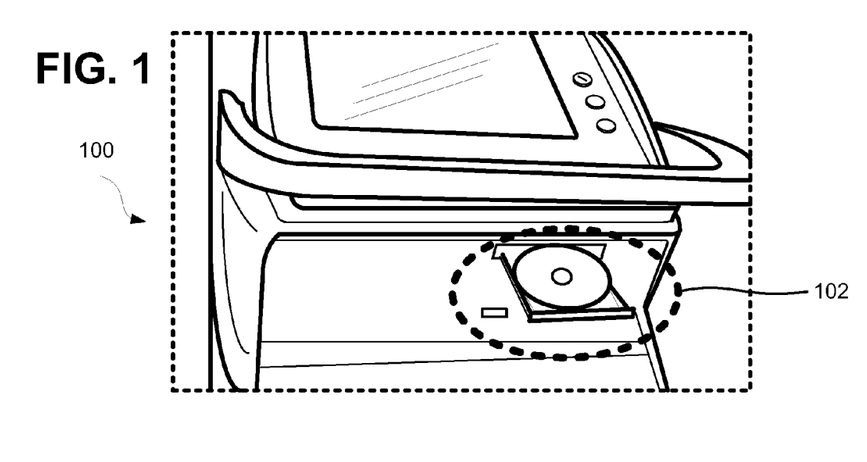
FIG. 1 illustrates a photograph of an exemplary imaging modality incorporating therein a removable media interface, in accordance with the present invention.

Referring now to the drawings, where like reference numerals refer to like parts, FIG. 1 is a photograph of a radiographic imaging apparatus (as an example of an imaging modality 100) including therein a processor configured to record radiographic image data with an embedded viewer in removable storage media 102. An example of the radiographic imaging apparatus (modality) is RadPRO® 40 kW Digital Mobile X-ray System distributed by Virtual Imaging Inc. or Fort Lauderdale, Fla. The imaging modality 100 may include any device capable of capturing an image of a patient anatomy such as a medical diagnostic imaging device. For example, the imaging modality 100 may include an X-ray imager, ultrasound scanner, magnetic resonance imager, or the like. In operation, the imaging modality 100 obtains one or more images of a patient anatomy. Image data representative of the image(s) along with a viewer is seamlessly stored in removable storage media 102.

Figure 2:
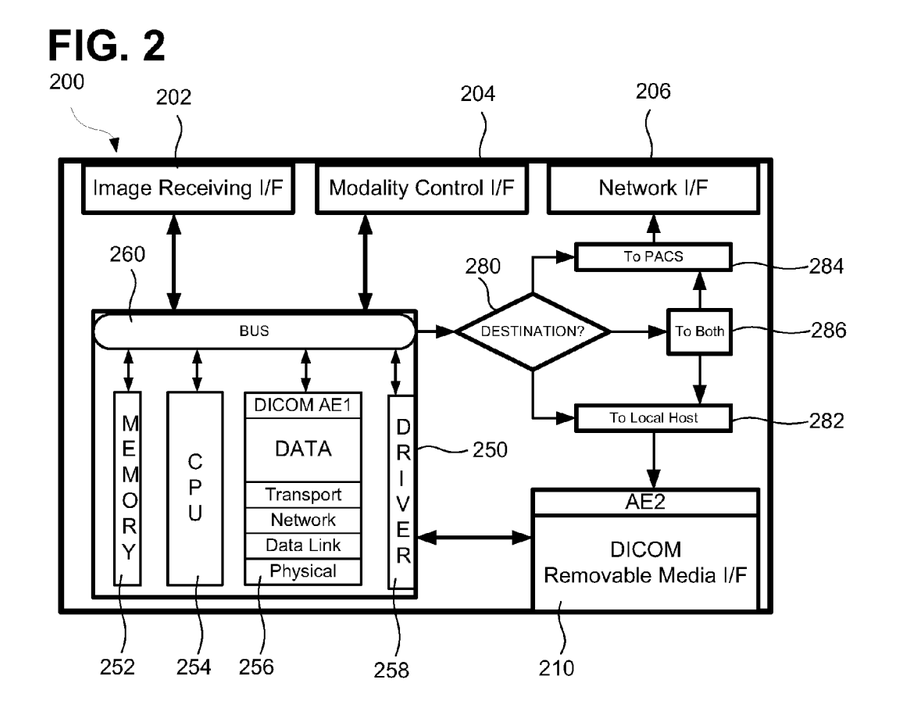
FIG. 2 illustrates a diagram of functional blocks corresponding to a hardware/software structure of an imaging modality, in accordance with the present invention.

FIG. 2 is a block diagram illustrating the functional blocks of an imaging modality 200, which is representative of the radiographic imaging apparatus shown in FIG. 1. As illustrated in FIG. 2, the imaging modality 200 includes an embedded computer 250, a DICOM removable media interface (I/F) 210, an image receiving interface 202, a modality control interface 204 and a network interface 206. In the case of a radiographic imaging modality, an example of the image receiving interface 202 includes a digital radiographic (DR) sensor, such as an x-ray flat panel detector (FPD), which may be operatively connected to the modality 200 via a wired or wireless connection. In addition, in the case of the radiographic imaging modality, the radiation source, which is necessary to generate an image, may also be considered part of the image receiving interface 202. Accordingly, as used herein, for the sake of brevity, the image receiving interface 202 includes any hardware and or software necessary to receive raw image data at the imaging modality 200, regardless of the type of modality. The modality control interface 204 may include, for example, a control panel (for allowing user interface) implemented by a liquid crystal display (LCD), a keyboard, a pointing device, buttons, switches and the like, which is provided embedded within the housing of the modality or attached thereto. An example of user interface (LCD panel, switches, etc.) is shown in FIG. 1 on the upper surface of modality 100. Notably, the modality control interface may also serve as a UI (user interface) for controlling a DICOM removable media interface 210. The Network interface 206 may include, for example, a physical hardware network interface such as an Ethernet® terminal or the like, for establishing communications either wired or wirelessly with external networked DICOM entities, such as a PACS storage database.

The modality-embedded computer 250 may include, among other things, a central processing unit (CPU) 254 implemented by one or more processors or microprocessors, a memory unit 252, a DICOM communications unit 256, and a media storage driver 258. Notably each of the operative units of computer 250 is interconnected the others via a data bus 260. Similarly, each of the image receiving interface 202, the modality control interface 204, the network interface 206 and the DICOM removable media interface 210 are also operatively connected to computer 250 via the data bus 260 or other known structure or circuit. Incidentally, it should be noted that the hardware structure of imaging modalities compliant with DICOM standards is assumed to be well known to persons having ordinary skill in the art. Accordingly, for the sake of brevity, only certain parts relevant to the present application are being described herein.

As used herein, memory unit 252 may include one or more hardware units necessary to store program instructions and/or data that can be accessed by the CPU 254, so that when executed by CPU 254 the program instructions or data will enable imaging and communications operations of the imaging modality 200. Memory unit 252 may also include storage space for image data received via the image receiving interface 202.

The DICOM communications unit 256 may include hardware, software or a combination thereof necessary to transmit DICOM formatted images either locally to the DICOM removable media interface 210, or to an outside destination, such as a PACS storage database, via the network interface 206. Preferably, however, DICOM communications unit 256 implements the functions of the stack protocol layer of the DICOM protocol and format. Specifically, according to the DICOM communications unit 256, at the bottom of the stack, the requirements of physical network environment is implemented. For example, the DICOM communications unit 256, using the bottom layer of the DICOM protocol stack, establishes physical communication to a remote device connected to an Ethernet or PACS network, via the network interface unit 206. A series of communication layers conforming to the International Standards Organization (ISO) are provided above the physical network layer. These layers include the data link layer, the network layer, the transport layer, a data (session, presentation and application) layer. Notably in the stack are included the Transport Control Protocol (TCP) and Internet Protocol (IP) layers, above which resides the DICOM upper layer protocol for TCP/IP communication.

The media storage driver 258 may include a specific program including software code stored in, for example, memory 252. The media storage driver 258 may also include hardware that under control of the CPU 254 enables control of the DICOM removable media interface 210 to initiate, process and end a storage operation to store image data onto removable storage media at the modality 200, without sending the image data out of the modality 200 by a network interface. The storage operation will be discussed below in more detail. The DICOM removable media interface 210 may include all hardware and software necessary to receive, process (format) and store DICOM formatted image data (and other information related thereto) in removable storage media. Therefore, although the DICOM removable media interface 210 is illustrated as a single component, this illustration is not limiting. For example, when a study is to be stored in optical storage media, such as a CD or DVD, an example of the DICOM removable media interface 210 is a CD or DVD burner associated with all necessary hardware circuitry and software programs. In this case, any commercially available CD/DVD burner operatively connected to the modality 200 may be considered a DICOM removable media interface 210. To that end, any a CD or DVD burner must be arranged within (inside) the body of modality 200 or attached directly thereto as applicable, so that the DICOM removable media interface 210 is physically and directly connected to the modality without using an external communication network therebetween.

In one embodiment, an example of removable storage media is a compact disc (CD) or a Digital Versatile Disc or Digital Video Disc (DVD). CDs may comprise Compact Disc Read Only Memory (CD-ROM), Compact Disc Recordable (CD-R), and Compact Disc Recordable and Writable (CD-RW). DVDs may comprise DVD Read Only Memory (DVD-ROM), DVD Recordable (DVD-R) and DVD Random Access Memory (DVD-RAM). In addition, although a description of an exemplary process for storing DICOM image data discussed below refers to CDs, those of ordinary skill in the art will appreciate that, in other embodiments, any suitable removable storage medium can be replaced for CDs. Notably, given the fragility of optical storage media such as CDs and DVDs, a mass storage device, such as a USB (Universal Serial Bus) storage device may be a highly attractive substitute to CDs and DVDs. An example of a USB storage device is a USB flash drive, but other USB storage devices such as Compact Flash compliant devices, multimedia cards or secure digital cards may also be used. In the case where a mass storage device is used as the storage medium, the DICOM removable media interface 210 may be implemented by a host controller for the pertinent type of mass storage device. For example, in the case where a USB mass storage device is used, the DICOM removable media interface 210 may be implemented by a USB host controller, such as a PCI USB card, and the software necessary to control the mass storage device. To enable medical image data transfer from the imaging apparatus (modality) to a USB storage device, the USB mass storage device class communications protocol may be used. In addition, to ensure that medical image data stored in a USB storage device is DICOM compliant, readers of this application should refer to the DICOM standard Supplement 87, published Jun. 15, 2004, by the DICOM standards committee Working Group 5.

Returning to FIG. 2, a brief overview of the manner in which imaging modality 200 operates to perform a local storage operation on removable storage media will be discussed. In its basic form, one of the aspects of the present invention may be considered as a hardware/software application that runs directly on the modality's computer. Notably, as discussed above, any known hardware may be used to implement the DICOM removable media interface 210. However, in combination with that hardware, the software application disclosed herein acts as what is generally known as a "plug-in" (plugin) program that will run directly on the modality's computer. As understood by persons having ordinary skill in the art, a plug-in program is a set of software components (modules) that adds specific functionality to an existing larger software application. In that sense, a plug-in program can server to customize the functionality of an already existing application. In accordance with embodiments of the present invention, the application disclosed herein may behave as a plug-in in the sense that it customizes the functionality of a modality, but it is in effect a separate application which conventional modalities currently lack. In this manner, an imaging modality equipped with the apparatus and methods disclosed herein does not need an additional workstation connected thereto, does not need a network for transferring images, does not need a separate DICOM CD/DVD burning station, and does not need a PACS server, as in the prior art. Instead, in accordance with embodiments of the present invention, the imaging modality is configured to do a "local send" within the modality itself (e.g., using a .localhost address), and then it seamlessly records the DICOM images and viewer in the removable storage media. To provide such functionality to an imaging modality, only a simple one-step installation procedure may be sufficient. For example, once an imaging modality is equipped with the above described DICOM removable media interface 210, the software part of the application can be delivered to the modality via portable storage media (e.g., CD, DVD or USB mass storage device), which will include an auto-executable installer program that would install the below described program "modules" on the modality's computer. Alternatively, where available, the application can be delivered to the modality via a wireless or wired network.

During operation, upon performing an imaging operation, for example, upon obtaining a study, the modality-embedded computer 250 is configured (programmed) to seamlessly initiate a storage operation. A "study" is the result of a request for a certain type of examination, which results in a series of one or more images depending on the required examination protocol. Although, a study may involve examination procedures on different modalities, for the purpose of the present application, it will be assumed that an entire study is being produced by a single modality. Advantageously, in accordance with the present application, computer 250 of modality 200 should be configured to determine a destination where the DICOM formatted image data from a study should be sent. This decision operation is illustrated in FIG. 2 by a decision module 280 indicating "DESTINATION". Specifically, in accordance with the present application, upon completing a study a decision can be made, either manually by a user or automatically by the modality, as to whether image data from the study should be sent outside of the imaging modality 200, for example, to a PACS archiving database, via communication module 284 and the network interface 206. Alternatively, a decision can be made as to whether image data from the study should be sent from the imaging modality 200 to a local removable storage medium, e.g., via a ".localhost" interface 282. Moreover, a decision may be made as to whether image data from the study should be sent (using a module 286) to both of an outside destination such as a PACS system via communication module and to a local removable storage medium, e.g., via the .localhost interface 282.

Here, it is assumed that persons having ordinary skill in the art are familiar with the process of sending a study from an imaging modality to an outside destination, such as a DICOM workstation or a PACS archiving database. Accordingly, description to that effect will be omitted. Notably in the present application, however, the manner in which the study can be sent locally to a removable media interface built within the modality itself or attached directly thereto will be described with reference to FIGS. 3A-3C and 4A-4B. As used herein, a DICOM removable media interface 210 may be considered to be "built within the modality" or "directly attached thereto" when DICOM formatted image data and information related thereto can be transferred from the modality directly to a removable storage medium without using a physical network, such as Ethernet or PACS.

Figure 3A:
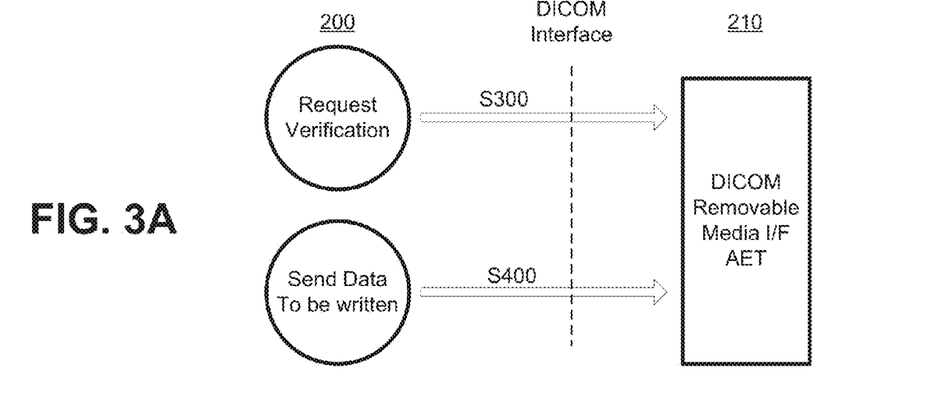
FIGS. 3A-3C illustrate data flow diagrams to graphically illustrate the internal flow of an study from a modality to a removable media interface, in accordance with the present invention.

Referring to FIG. 3A, a flow diagram is used to explain the flow of data between modality 200 and DICOM removable media interface 210. It is assumed that modality 200 and DICOM removable media interface 210 are enabled to operate simultaneously. For example, upon powering ON the modality 200, the DICOM removable media interface 210 is also automatically placed in operative state (i.e., ON state). At the convenience and need of the operator, the modality 200 is used to perform a study and generate a series of one or more DICOM images in a known manner. For example, in the case of a radiographic imaging modality, a subject may be imaged in the following manner. A radiation source (not shown) attached to the modality 200 via a support arm or the like emits x-ray radiation directed onto a region in which the subject is positioned. A portion of the radiation passes through the subject and impinges on a surface of a DR sensor (e.g., a flat panel detector) in a known manner. As will be appreciated by those of ordinary skill in the art, the DR sensor converts the radiation received on its surface to electric signals and forms an image signal. The image signal is then electronically received at the image receiving interface 202 of imaging modality 200. Indeed, a plurality of images can be obtained in this manner, and the CPU 254 is configured to process the received images to generate a study. When a study is completed, the modality 200 is programmed to transfer the study locally to the DICOM removable media interface 210, so that the study may be stored in removable storage media in a digital format.

In the meantime, the DICOM removable media interface 210 is idle waiting and checking whether a request for a storage operation arrives. When the modality 200—either based on input from the operator or based on programmed control—receives input indicative that the study has been completed, the modality 200 sends a request (S300 in FIG. 3A) for storage operation to the DICOM removable media interface 210. Upon receiving the request, the DICOM removable media interface 210 undergoes a verification process (shown in FIG. 3B). Specifically, at this state, certain negotiations are performed under the DICOM protocol, in which it is determined the basic capabilities of the modality 200 and those of the DICOM removable media interface 210. For example, the modality 200 sends specific indication that a study is to be stored in removable storage media (S301). In response, the DICOM removable media interface 210 performs a determination as to whether or not it can perform the desired storage operation. For example, the DICOM removable media interface 210, under the control of CPU 254 and driver 258, may determine whether removable storage media (e.g. CD/DVD) is present. Upon determination of its capabilities, the DICOM removable media interface 210 sends a pertinent response to the modality 200 (S302). Once the capabilities of the modality 200 and the DICOM removable media interface 210 have been established, the actual exchange of data takes place. Specifically, the modality 200 sends the series of one or more images concerning the study generated by the CPU 254 to the DICOM removable media interface 210 (S304). In response, the DICOM removable media interface 210 sends an appropriate response (S305). For example, the DICOM removable media interface 210 may send an acknowledgement (ACK) signal indicating that the entire study has been received. Alternatively, in the case that any anomalies occur during the transfer of the study, the DICOM removable media interface 210 may also send a negative acknowledgement (NAK), which may be used to cause the operator to resend the study. Once the study has been properly receive the DICOM removable media interface 210 proceeds to perform the storage operation. Advantageously, since the DICOM removable media interface 210 resides within the modality itself, the process of transferring the study does not occur over a physical network. Instead, the negotiation and exchange processes occur within the modality itself and data exchange is performed locally within the modality.

Figure 3B:
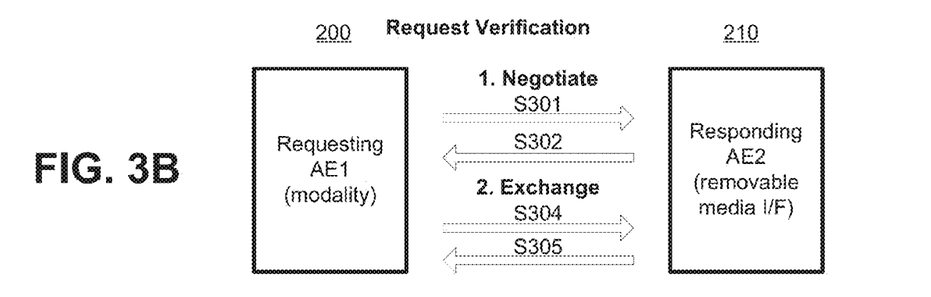
Figure 3C:
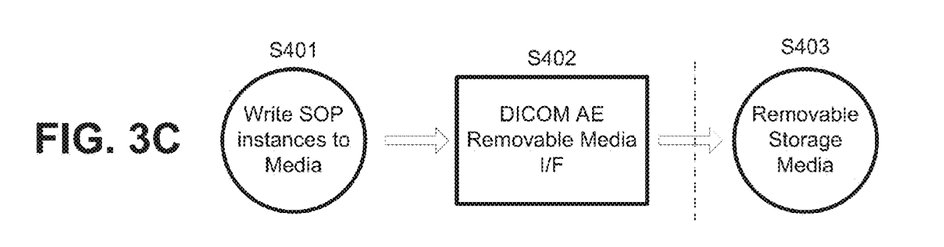

Referring to FIGS. 3A-3C, an application data flow diagram is explained graphically in accordance with an embodiment of the present application. Specifically, in these figures, it is shown that the DICOM removable media interface 210 waits for other Storage SCU application to connect at a specific TCP/IP port number and will accept association with Presentation Context for the Storage Service class. Specifically, in the present embodiment, modality 200 is set as a first application entity (AE1) and the DICOM removable media interface 210 is set as a second application entity (AE2). The first application entity (modality 200) connects to the second application entity (the DICOM removable media interface 210) via localhost interface under TCP/IP protocol.

For example, to transfer data within the same computer, the loopback address (127.0.0.1) or "localhost" is used as the destination. The ".localhost" destination address in TLD (template description language) has traditionally been statically defined in host DNS (domain name service) implementations as having an A record pointing to the loop back IP address and is reserved for such use. Any other use would conflict with widely deployed code which assumes this use. Accordingly, embodiments of the present invention make effective use of the .localhost destination address (127.0.0.1) or some variant of it (e.g., 127.0.0.1/4664), to safely and reliably send DICOM images in an identical manner as with other computers on a physical network. Advantageously, however, transferring data within the same computer bypasses the local area network (LAN) interface hardware. In this manner, any modality can be liberated from the constraints of having to be attached to a network (Ethernet or PACS) to store DICOM images.

The Internet Engineering Task Force (IETF) has established specific IP addresses that act as a .localhost destination address for loop back purposes. See, for example, IETF document RFC 330 (Special-Use IPv4 Addresses), which describes the usage of the IPv4 address block 127.0.0.0/8 for loopback purposes. For IPv4 communications, the virtual loopback interface of a computer system is normally assigned the address 127.0.0.1 with subnet mask 255.0.0.0. Depending on the specific operating system in use (notably Linux and Microsoft Windows) and the routing mechanisms installed in the computer, this populates the routing table of the local system host with an entry so that packets destined to any address from the 127.0.0.0/8 address block would be automatically routed internally to the network loopback device. In this manner, any IP datagram with a source or destination address set to a loopback address does not appear outside of the local computer 250 and is not routed by any routing device. Instead, in the present case, it is sent to the DICOM removable media interface 210.

FIG. 3C is a data flow diagram illustrating the flow of DICOM image data from modality 200 to the removable media interface and to the storage media, in accordance with an embodiment of the present invention. Referring back to FIGS. 3A and 3B, once the verification process has been completed, the modality 200 sends the DICOM imaged data as service object pair (SOP) instances, as shown at S401 in FIG. 3C. The DICOM removable media interface 210 is configured to receive the SOP instances from the modality 200, for example via the .localhost address as explained above. Upon receiving the DICOM image data, the DICOM removable media interface 210 proceeds to store (record or write) on removable storage media, such as CD/DVD or FLASH drive device, the received data. Advantageously, SOP instances are received via the .localhost address without using a physical network as requests from the first DICOM application entity (AE1), acting as a service class user (SCU), requesting one of various storage service classes. The central processing unit (CPU) 254 of the modality-embedded computer 250 is configured to execute object oriented program modules (see FIGS. 4A-4B) and to control the DICOM removable media interface 210 via the driver 258, so that the DICOM removable media interface 210 acts as a service class provider (SCP) for various storage SOP classes.

Figure 3D:
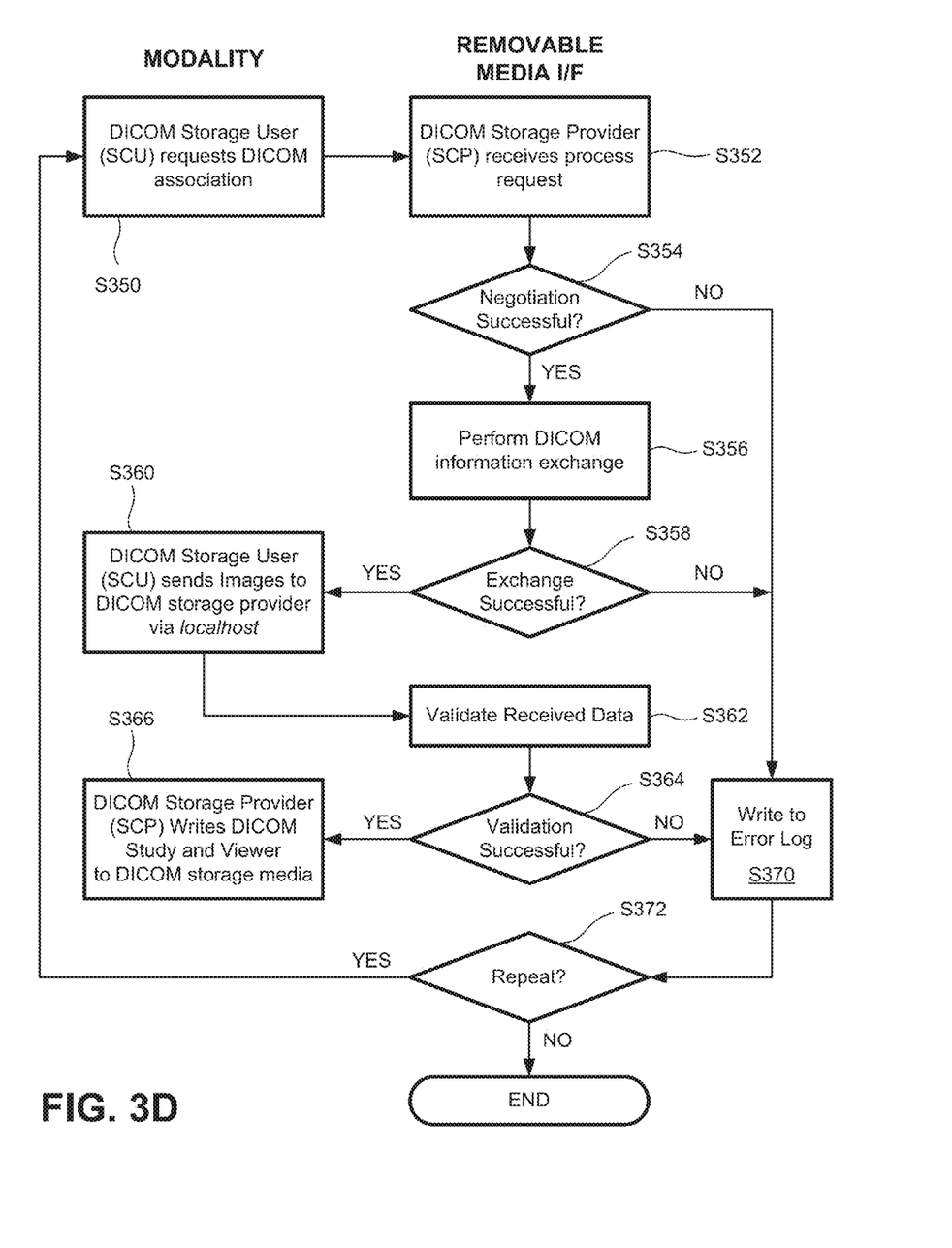
FIG. 3D illustrates exemplary process steps of a method of storing DICOM image data and a viewer program directly from a modality onto removable storage media.

A more detailed process for a method of recording medical image data directly from the imaging modality onto the removable storage media is illustrated in FIG. 3D. In FIG. 3D, it is assumed that the imaging modality has undergone an imaging operation, and is now at the state where image data in DICOM format (medical images and data related thereto) is ready to be sent to PACS. However, in the case where a PACS system is not available (e.g., in a field-deployable imaging modality), the imaging modality according to the aspects of the present invention is configured to record the image data in DICOM format and a DICOM viewer directly from the imaging modality onto removable storage media, such as a CD, DVD or a FLASH memory device. To that end, the imaging modality is set to act as a DICOM storage user (SCU), and the removable media interface 210 is set to act as a DICOM storage provider (SCP); and the computer 250 is programmed to execute the flow process illustrated in FIG. 3D to seamlessly start at the completion of an imaging operation in the imaging modality.

At step S350, the computer 250 of the imaging modality, acting as a DICOM storage user (SCU) sends a DICOM storage request to the removable media interface 210. At step S352, the removable media interface 210, acting as the DICOM storage service provider (SCP) receives the storage request. Here, a verification process as described above in reference to FIG. 3B takes place. Then, at step S354, it is determined whether negation has been successful. Should negotiation be unsuccessful, for example, storage media is not present or cannot record the desired amount of the data (NO at S354), an error is written to an Error Log at step S370. Upon successful negotiation (YES in S354), an actual exchange of DICOM information data takes place at step S356. Should DICOM exchange be unsuccessful, an error is written to an Error Log at step S370. If the DICOM exchange is successful (YES at S358), the modality 200 sends the medical image data to the DICOM removable media interface 210 via the localhost address (S360), as explained above.

At step S362, the removable media interface 210 validates the received data. For example, the image data to be recorded onto the removable storage media may be validated to see if it contains all DICOM headers, or if the images will be compatible with the DICOM viewer. Should DICOM validation be unsuccessful (NO at S364), an error is written to an Error Log at step S370. If the DICOM validation is successful (YES at S364), the computer 250 controls the DICOM removable interface 210 via the driver 258 to write (record) the DICOM images and the DICOM viewer onto the removable storage media at step S366. At each occasion where an error occurs, the error is written to the Error Log at step S370. In addition, after recording the error, a warning can be provided to prompt the user to input an instruction as to whether the operation should be repeated (YES at S372) or ended (NO at S372).

In this manner, the DICOM removable media interface 210, under the control of the modality-embedded computer 250 can initialize a storage operation by acting as an FSC (file set creator) to create a new DICOM file set on any appropriated removable storage media (S403 of FIG. 3C). A detailed list of the various storage SOP classes that can be provided by the DICOM removable media interface 210 are listed below.

In accordance with at least one embodiment, DICOM removable media interface 210, under the control of specific program modules executed by CPU 254, provides Standard Conformance to at least the following DICOM 3.0 SOP instances as a Service Class Provider (SCP) listed on Table 1.

TABLE 1

| SOP Class Name | SOP Class UID |
|---|---|
| Verification | 1.2.840.10008.1.1 |
| CR Image Storage | 1.2.840.10008.5.1.4.1.1.1 |
| CT Image Storage | 1.2.840.10008.5.1.4.1.1.2 |
| DX Image Storage (Presentation) | 1.2.840.10008.5.1.4.1.1.1.1 |
| DX Image Storage (Raw) | 1.2.840.10008.5.1.4.1.1.1.1.1 |
| MR Image Storage | 1.2.840.10008.5.1.4.1.1.4 |
| US Image Storage (Retired) | 1.2.840.10008.5.1.4.1.1.6 |
| US Image Storage | 1.2.840.10008.5.1.4.1.1.6.1 |
| US Multi-Frame Image Storage (Retired) | 1.2.840.10008.5.1.4.1.1.3 |
| US Multi-Frame Image Storage | 1.2.840.10008.5.1.4.1.1.3.1 |
| SC Image Storage | 1.2.840.10008.5.1.4.1.1.7 |
| MG Storage (Presentation) | 1.2.840.10008.5.1.4.1.1.1.2 |
| MG Storage (Raw) | 1.2.840.10008.5.1.4.1.1.1.2.1 |
| Multi-frame True Color Secondary Capture Image | 1.2.840.10008.5.1.4.1.1.7.4 |
| Multi-frame Grayscale Byte Secondary Capture Image Storage | 1.2.840.10008.5.1.4.1.1.7.2 |
| NM Image Storage (Retired) | 1.2.840.10008.5.1.4.1.1.5 |
| NM Image Storage | 1.2.840.10008.5.1.4.1.1.20 |
| XA Image Storage | 1.2.840.10008.5.1.4.1.1.12.1 |
| RF Image Storage | 1.2.840.10008.5.1.4.1.1.12.2 |
| Standard PET Image | 1.2.840.10008.5.1.4.1.1.128 |

An example of offered Interchange options for DICOM 3.0 Media Storage service class, in accordance with the present invention, is shown in Table 2, shown below.

TABLE 2

| Application Profile | Activity | Role | Service Class Option |
|---|---|---|---|
| STD-GEN-CD | Write to CD | FSC | Interchange |
| STD-GEN-DVD | Write to DVD | FSC | Interchange |

The goal here is to provide a solution that seamlessly resides on the modality and archives DICOM images to removable storage media, such as CD/DVD, USB flash drives or the like. The solution also includes an embedded DICOM viewer which allows viewing the images of a study on any PC even if specialized software is not available. Moreover, the solution is capable of storing images and information related to an entire study in removable storage media or to produce hard copies of medical images via Windows print when a PACS system is not in available. Notably, the DICOM viewer has the ability of converting DICOM images to JPEG format for ease of archive, e-mail and print. The DICOM viewer includes a dynamic user interface (UI) for manipulating images in various modes. With minor modifications in the User Interface (UI) Study List section of the viewer, the solution can be adapted for the industrial, veterinarian or field-deployable medical market.

Figure 4A:
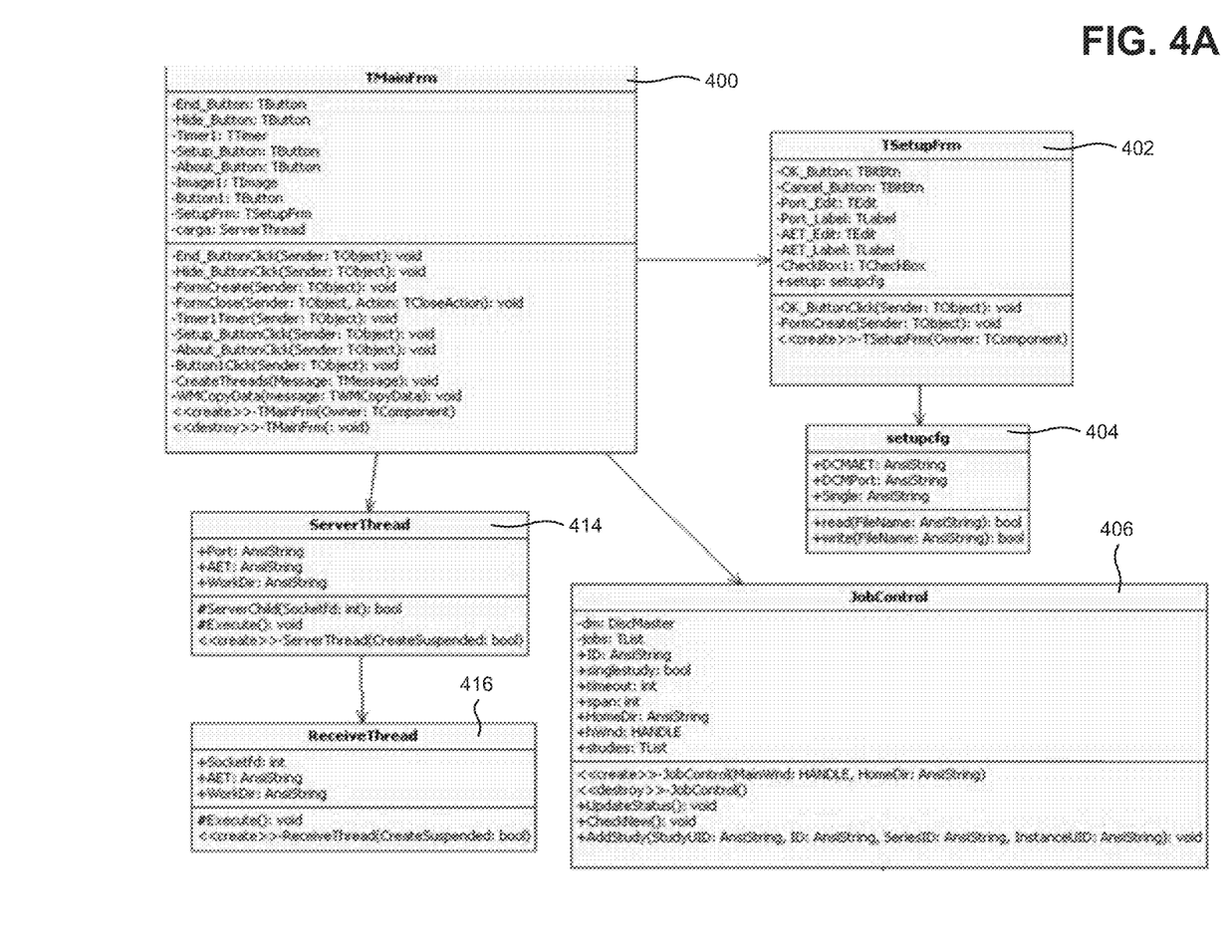
FIGS. 4A-4B is a detailed functional diagram to explain processing performed by a modality-embedded computer to control the removable media interface to store medical images and information related thereto onto removable storage media.
Figure 4B:
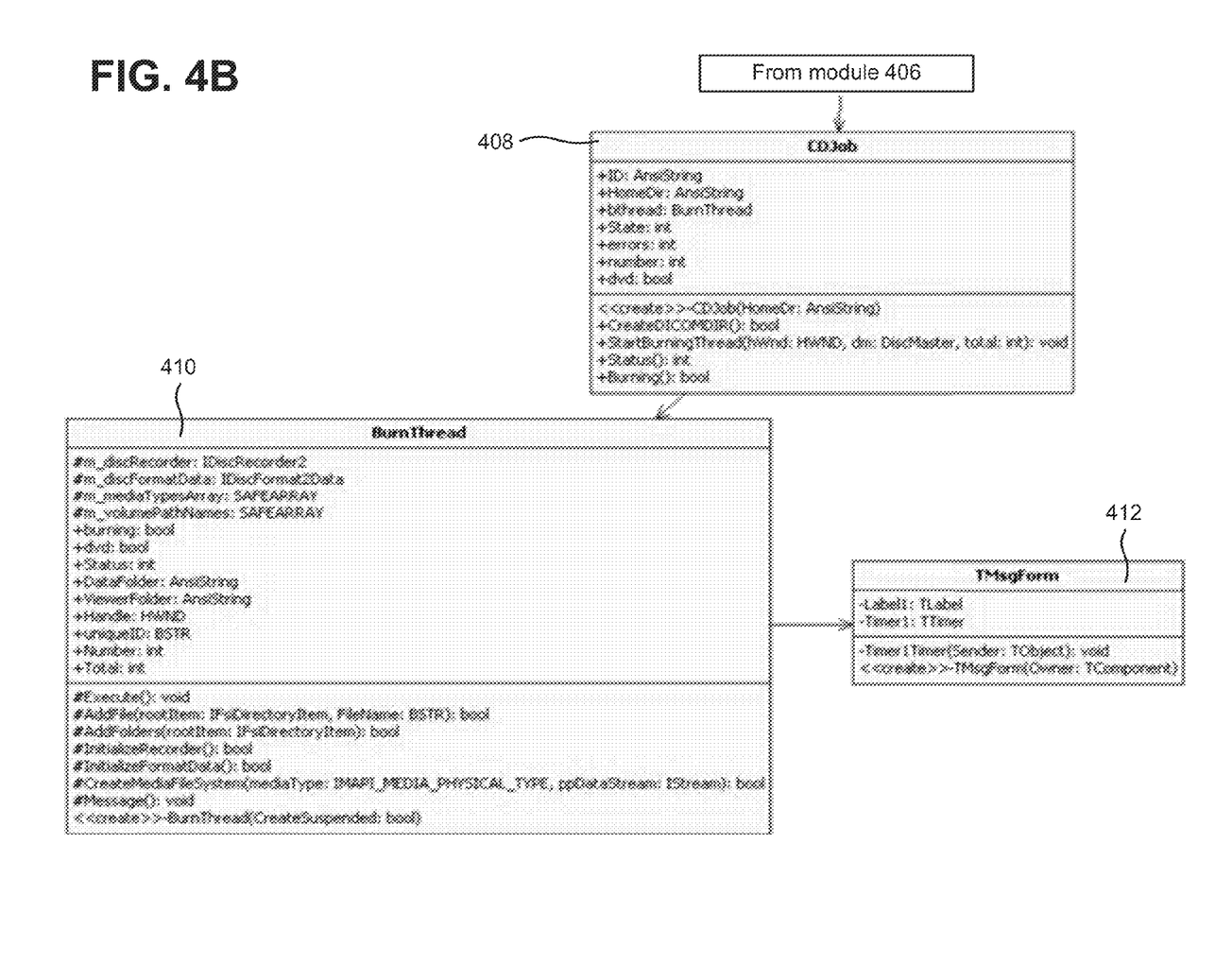

FIGS. 4A and 4B illustrate an exemplary program structure that can be executed by the CPU 254 of the imaging modality 100 which may be used to implement a process for storing medical image data in removable storage media directly at the modality, in accordance with the first embodiment of the present invention Preferably, the program structure is object-oriented. Data representations and their associated operations are encapsulated in an abstract data type. Namely, Components: are objects, and Connectors: are function and procedure invocations (processes or process steps). This type of architecture is suitable for applications such as CDIB class from Visual C++ in which the objective is identifying and protecting related bodies of information (data). In other words, the data representation is hidden from other objects and can only be accessible though specific connectors, as defined herein. In such a structure, procedure invocation is determined by object, rather than by case statements. Restrictions on how information within objects is used (encapsulation). Usefulness determines the simplicity of the data structures in the components. Reuse is achieved through inheritance. The distribution of the components through inheritance adds a layered structure to the architecture.

In the present example, the use of understandable names allows the developer to comprehend rapidly the architecture of the program structure. In addition, the correct reuse of the 'top' classes (through inheritance) clearly shows the interrelations between the components. Because an object hides its data representation from the other components, it is possible to change the implementation without affecting those components. Thus the system could be seen as collections of autonomous interacting agent functions.

Using the object-oriented approach may advantageously give the developers a solid ability to manage construction and modification of objects, centralizing these operations in one location. Furthermore, as illustrated in the unified modeling language (UML) diagrams, the object-oriented approach allows for a relatively easy distribution of objects. Accordingly, the architectural approach shifts focus towards object interfaces and away from arbitrary procedure interfaces.

In FIG. 4A, object module 400 illustrates contents the "TMainFrm" class. This class invokes the implementation the main User Interface (UI). It implements the logic to create a new DICOM Server Thread. When executed in the CPU 254 of the imaging modality 100 of the present embodiment, the "TMainFrm" class passes control parameters to each of "TSetupFrm" class, "JobControl" class and "ServerThread" class. Specifically, when the TMainFrm class is run, the "TSetupFrm" class will be invoked through the "Setup" button of the main UI to change the application configuration. Relevant sections of object module 400 the "TMainFrm" class are tabulated in Table 3.

TABLE 3

| Class Name | TMainFrm |
|---|---|
| Inherited class | None |
| Aggregated Classes | None |
| Associated Classes | None |
| Data Members | TButton *End__Button |
| | TMemo *Memo |
| | TButton *Hide__Button |
| | TTimer *Timer |
| | TButton *Setup__Button |
| | TButton *About__Button |
| | TImage *Image |
| Member Functions | Void __fastcall End__ButtonClick(TObject *Sender) |
| | Void __fastcall Hide__ButtonClick(TObject *Sender) |
| | Void __fastcall FormCreate(TObject *Sender) |
| | Void __fastcall FormClose(TObject *Sender, TCloseAction &Action) |
| | Void __fastcall Timer1Timer(TObject *Sender) |
| | Void __fastcall Setup__ButtonClick(TObject *Sender) |
| | Void __fastcall FormCreate(TObject *Sender) |
| | Void __fastcall About__ButtonClick(TObject *Sender) |
| | Void __fastcall About__ButtonClick(TObject *Sender) |
| | Void __fastcall logininfo(string Msg) |
| | __fastcall TMainFrm(TComponent *Owner) |
| Processing | implementation of main User Interface (UI); create a new DICOM Server Thread; call TSetupFrm class through the "Setup" button of UI |

The "TSetupFrm" class is illustrated as object module 402. This class includes the implementation parameters and actions for modifying the application default configuration. When executed, this class invokes and passes control to "setupcfg" class. The "TSetupFrm" class illustrated as object module 402 is tabulated as Table 4.

TABLE 4

| Class Name | TSetupFrm |
|---|---|
| Inherited class | None |
| Aggregated Classes | None |
| Associated Classes | None |
| Data Members | void __fastcall OK__ButtonClick(TObject *Sender) |
| | void __fastcall FormCreate(TObject *Sender) |
| | __fastcall TSetupFrm(TComponent *Owner) |
| Member Functions | TBitBtn *OK__Button |
| | TBitBtn *Cancel__Button |
| | TPageControl *PageControl1 |
| | TTabSheet *TabSheet2 |
| | TEdit *Port__Edit |
| | TLabel *Port__Label |
| | TEdit *AET__Edit |
| | TLabel *AET__Label |
| | TLabel *Label2 |
| | TEdit *Key__Edit |
| | TLabel *Label3 |
| | TCheckBox *CheckBox1 |
| | Setupcfg setup |
| Processing | modify application default configuration parameters. |

Object module 404 illustrates "setupcfg" class. This class includes the implementation for reading/writing the configuration information. Contents of the module are tabulated below in Table 5.

TABLE 5

| Class Name | setupcfg |
|---|---|
| Inherited class | None |
| Aggregated Classes | None |
| Associated Classes | None |
| Data Members | String DCMAET // |
| | String SCMPort // |
| | String KEY // |
| | String Single // |
| Member Functions | Bool read(FileName) // Read file |
| | Bool write(FileName) // Write to file |
| Processing | reading/writing configuration information |

"JobControl" class is illustrated as object module 406. This class manages the start of new CD jobs when DICOM images arrive, it will do CD/DVD spanning based on the size of the studies/series/images, and it will check the burning job status. Disc spanning is a feature of CD and DVD burning that automatically spreads a large amount of data across many data discs if the size of the data set exceeds the storage capacity of an individual blank disc. The advantage is that the user does not need to split up files and directories into two or more (blank disc sized) pieces by hand. Thus, when executed, this class will check the burning job status and provide prompts for additional discs when necessary. Objects and relevant section of the JobControl class are listed in Table 6.

TABLE 6

| | |
|---|---|
| Class Name | JobControl |
| Inherited class | None |
| Aggregated Classes | None |
| Associated Classes | None |
| Data Members | DiskMaster *dm |
| | Bool singlestudy //Boolean value for single study |
| | Int timeout // holds timeout value |
| | Int span // holds timeout value |
| | AnsiString HomeDir // root directory |
| | AnsiString ID // working directory |
| | HANDLE hWnd |
| | This *jobs |
| | Tlist *studies |
| Member Functions | JobControl(HANDLE MainWnd, AnsiString HomeDir) |
| | Void UpdateStatus( ) // |
| | Void CheckNew( ) // |
| | Void AddStufy(AnsiString StudyUID, AnsiString ID, AnsiString SeriesID, AnsiString InstanceUID) |
| Processing | manage start of new CD job when images arrive, CD/DVD spanning based on size of the studies/series/images, and check the CD burning job status. |

"CDJob" class is illustrated as object module 408. This class, similar to JobControl, but more specific, it handles individual CD burning job options. It will start a new CD Burning job in response to images arrival and will check the burning job status. Table 7 lists relevant objects of the CDJob class.

TABLE 7

| | |
|---|---|
| Class Name | CDJob |
| Inherited class | None |
| Aggregated Classes | None |
| Associated Classes | None |
| Data Members | String ID // |
| | String HomeDir // root directory |
| | Int State |
| | Int errors |
| | Int number |
| | Bool dvd |
| | BurnThread *bthread |
| Member Functions | CDJob(AnsiString HomeDir) |
| | Bool CreateDICOMDIR( ) |
| | Void StartBurningThread(HWND hWnd, DiscMaster dm, int total) |
| | Int Status( ) |
| | Bool Burning( ) |
| Processing | handle individual CD burning job options; start new CD Burning job upon images arrival; check the burning job status. |

Class "BurnThread" is illustrated in FIG. 4B as module 410. The BurnThread class receives control from "CDJob" class (module 408). This class implementation represents the actual CD burning process. It will notify the user if no disk is inserted (or blank disk is necessary) for executing a burning job. BurnTread objects are listed in Table 8.

TABLE 8

| | |
|---|---|
| Class Name | BurnThread |
| Inherited class | None |
| Aggregated Classes | None |
| Associated Classes | None |
| Data Members | Bool burning |
| | Bool dvd |
| | Int Status |
| | Int Number |
| | Int Total |
| | String DataFolder |
| | String VewerFolder |
| | String uniqueID |
| | HWND Handle |
| | IDiskRecorder2 *m_discRecorder |
| | IDiskFormat2Data *m_discFormatData |
| | SAFEARRAY *m_mediaTypesArray |
| | SAFEARRAY *m_volumePathNames |
| Member Functions | Void _fastcall Execute( ) |
| | Bool AddFile( )(IFsiDirectoryItem *rootItem, BSTR FileName) |
| | Bool AddFolders(IFsiDerectoryItme *rootItem) |
| | Bool InitializeRecorder( ) |
| | Bool InitializeFormatData( ) |
| | Bool CreateMediaFileSystem-(IMAPI_MEDIA_PHYSICAL_TYPE mediaType, IStream **ppDataStream) |
| | Void -fastcall Message( ) |
| Processing | executes actual media storing process (CD burning); prompts user for storage media (if necessary). |

"DiskMaster" or "DiscMaster" class, not illustrated in the figures but listed in Table 9, this class implementation handles the CD Burner high level interface.

TABLE 9

| | |
|---|---|
| Class Name | DiskMaster |
| Inherited class | None |
| Aggregated Classes | None |
| Associated Classes | None |
| Data Members | |
| Member Functions | Long GetTotalDevices( ) |
| | BSTR GetDeviceUniqueID(long index) |
| Processing | This class implementation handles the CD Burner high level interface |

Figure 5A:
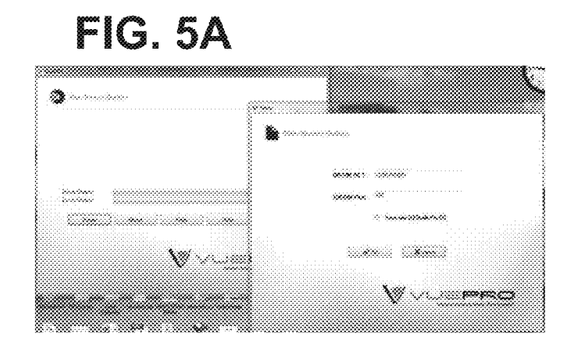
FIGS. 5A-5B are screen shots of an example of a user interface used to control storage of an study (images of a subject) onto removable storage media.
Figure 5B:
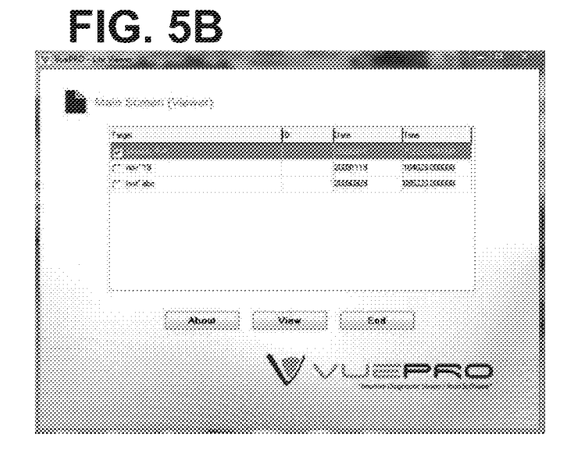

"TMsgForm" class, illustrated in FIG. 4B as module 412, receives control from the BurnThread class module. The TMsgForm class implementation will handle the notification of status messages, such as "Insert Blank CD" and "CD Burning finished". Objects of this class are listed in Table 10. Notably, status messages can be provided through the modality control interface, which also functions as the user interface (UI) for the DICOM removable storage unit interface 210. An example of the functions provided by the TMsgForm may be displayed in the UI as shown, for example, in FIGS. 5A-5B.

TABLE 10

| | |
|---|---|
| Class Name | TMsgForm |
| Inherited class | None |
| Aggregated Classes | None |
| Associated Classes | None |
| Data Members | TLabel *Label1 |
| | TTime *Timer1 |
| Member Functions | void _fastcall Timer1 Timer(Tobject *Sender) _fastcall TMsgFormITComponent *Owner) |
| Processing | notification of status messages, e.g., "Insert Blank CD" and "CD Burning finished". |

Returning to FIG. 4A, module 414 illustrates the "ServerThread" class. The SeverThread class receives direct control from the TMainForm class, and when executed the ServerThead class class represents the implementation of DICOM Storage SCP Class. It implements the association and the receiving of DICOM objects and also of the DICOM Echo Verifications. Member and functions of the ServerThread class are listed in Table 11.

TABLE 11

| Class Name | ServerThread |
|---|---|
| Inherited class | None |
| Aggregated Classes | None |
| Associated Classes | None |
| Data Members | String Port |
| | String AET |
| | String WorkDir |
| Member Functions | bool __fastcall ServerChild(int Socketfd) |
| Processing | implement DICOM Storage SCP Class; |
| | DICOM association; |
| | receiving of DICOM objects |
| | DICOM Echo Verifications. |

In module 416 of FIG. 4A, class "ReceiveThread" is illustrated as receiving control from ServerThread class (module 414). The ReceiveThread class performs logic implementation for saving DICOM Objects to the File system during the burning process, and can also serve to save the same DICOM objects to a database. Functions and object members of the ServerThread calls are listed below in Table 12.

TABLE 12

| Class Name | ReceiveThread |
|---|---|
| Inherited class | None |
| Aggregated Classes | None |
| Associated Classes | None |
| Data Members | Int Sockedfd |
| | String AET |
| | String WorkDir |
| Member Functions | __fastcall ReceiveThread(bool CreateSuspended) |
| Processing | This class implements the logic for saving DICOM Objects to the File system and to the database. |

In this manner, when taken in consideration together FIG. 4A and FIG. 4B represent a seamless integration of a process for storing DICOM image data in removable storage media directly at the imaging modality, without the use of PACS or other communications network.

The modules described in the foregoing description may be preferably implemented as object oriented program modules. The modules may advantageously be stored on an addressable storage medium (memory) and configured to be executed on one or more processors. However, the modules are not limited to software per se, rather the modules may include software or hardware components that perform certain tasks. Thus, a module may include, for example, object-oriented software components, class components, processes methods, functions, attributes, procedures, subroutines, segments of program code, drivers, firmware, microcode, circuitry, data, databases, data structures, tables, arrays, variables, or combinations thereof. Multiple modules may be integrated to form groups of modules, or a single module may be separated to form part of multiple modules.

The solution is a software application that guides the user to create media (e.g., CD/DVD) which will serve as a resource to review images as a reference record. In particular, the software will support multiple modalities (Application Entities) which can initiate DICOM associations through a specific TCP/IP port, preferably the localhost address.

Exemplary Software Architecture

Applicable software modules enable a setup process in which the imaging modality 200 is designated as first application entity (AE1) and a CD/DVD burning hardware as an example of the DICOM removable media interface 210 is set as a second application interface. The software can be tailored so that the DICOM removable media interface 210 supports multiple Application Entities. Many DICOM Image Storage SCUs may initiate or maintain associations with the application that will perform the actual storage operation. The software is based on three major components:

Image Storage SCP: establish or designate the DICOM removable media interface 210 (media writer) as the DICOM service class provider (SCP);

Image Storage SCU: establish or designate the modality as the DICOM service class user (SCU);

Interchange Option for Media Storage (Media Interchange): enable data interchange locally within the modality itself in accordance with the DICOM communication protocol and image format. The DICOM Media Storage Service Class defines certain services.

The application waits for other Image Storage SCU applications to connect at a specific TCP/IP port number. It will accept associations with Presentation Context for the Image Storage Service classes. The software provides standard conformance to the DICOM 3.0 Interchange option for Media Storage service class with the FSC (File Set Creator) role, being able to create or write at least to CD/DVD and USB storage media type, or other applicable media.

The following are some of the DICOM CD Burner features:

DICOM C-STORE implementation: Support for C-Store DICOM operation, allowing a Service Class User (SCU) to send a persistent storable object (images with pixel data) to a Service Class Provider (SCP), making the solution to serve as a DICOM storage backup system. Advantageously, this feature is considered enormously supportive in environments where a PACS system is not available.

Multi-Threaded Architecture: The disc burner software is written with a multi-threaded architecture. This allows the software to perform a number of procedures at the same time. This type of architecture allows disc creation jobs to complete expeditiously and accurately.

Smart Spanning: Large exams are automatically broken apart into a logical manner so that large exams can be distributed among plural units of storage media. The solution uses an algorithm that will span the study across multi-disc jobs in the best possible place.

CD or DVD media: The solution automatically stores studies on CDs or DVDs. Each of these discs allows the user to store approximately 700 MB, or 4.7 GB, respectively.

IHE/DICOM compliant discs: The solution adheres to DICOM and IHE standards. These standards ensure anyone receiving the discs are able to easily view and import the discs into their infrastructures.

Seamless Integration: The software seamlessly integrates with known image receiving interfaces. For example, a test platform has been created to be compatible with Canon CXDI software, which runs image acquisition from a variety of x-ray flat panel detectors, such as the CXDI-70C Wireless Premium Flat Panel Detector available Canon Medical Systems a division of Canon USA Inc. of Lake Success, N.Y. The software solution supports Windows® XP, Vista and 7 Operating Systems. The recommended minimum display resolution is 800×600 pixels.

User Friendly: DICOM settings can be configured on the fly. Once launched, the application runs on the background requiring minimal to no user intervention.

Figure 6A:
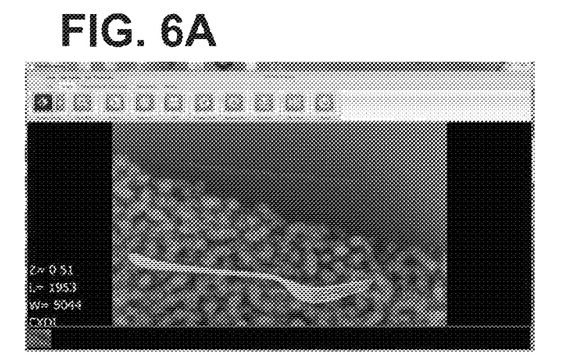
FIG. 6A-6B are screen shots of a viewer used to observe exemplary images stored in the removable storage media.
Figure 6B:
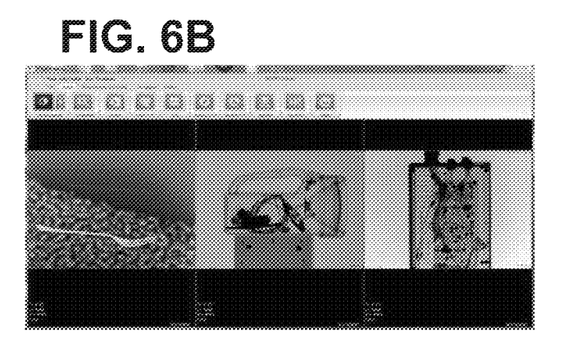

The solution may be integrated either with commercially available DICOM viewers, or it may be modified to be integrated with custom designed viewing applications. In an example built by the inventors herein, as shown in FIG. 6A and FIG. 6B, some of the following features were found to be highly useful in a DICOM viewer.

Compression schemes: The viewer should preferably include support for stream-based compression schemes (lossless, lossy), uncompressed and multiframe DICOM images.

Windows printing: A particularly useful feature is the capability to print DICOM images to standard Windows® printers at any location without the need for specialized DICOM printing devices. The feature may be particularly advantageous to industrial and law enforcement entities where specialized DICOM and PACS systems are not readily available.

Export Function: Export of the images to local hardware in JPG format.

Cine Playback: Capable of playing back multi-frame sequences.

Measurement Tools: Support for Distance and Angle measurements giving the user the capability to delete any or all of the taken measurements. Exemplary software has been implemented with the ability to establish a spatial reference in a focal plane of an image, providing maximum measurement accuracy.

Study Navigation: Support for easy navigation of studies, series or images within the studies Window Presets: Choice of computed window/level settings that when selected applies to the active viewport.

Window/Level: Adjust the contrast and brightness of the image by simply dragging the mouse.

Layout Within Viewport: Choice of selected grid sizes to use within a single viewport. Support single viewport with up to 2×3 grid size.

Annotation Tool: It gives the user the ability to perform text annotation and image annotation, such as drawing rectangles, circles or arrows to indicate specific areas of the image.

Image Manipulation: Support for standard image manipulation operations such as Invert, Zoom, Pan, Rotate and Flip.

Advance Image Manipulation: Support for Region of Interest (ROI) and Color Lookup Table (Color LUT) operations. Under ROI—The user is capable to: Apply Window/Level inside the region, Apply Color LUT, perform any of the standard image manipulation operations, drag the ROI to another location in the image. Under Color LUT—The user is capable to: apply Window/Level, and perform any of the standard image manipulation operations.

DICOM Dump: Support for decoding and dumping the content of DICOM 3.0 files. The user is provided with a textual dump of the DICOM file to analyze the Data Elements composing the DICOM Data Set.

While the present invention has been described with reference to exemplary embodiments, persons having ordinary skill in the art will appreciate that many variations are possible within the scope of the examples described herein. Thus, should be understood that structural and functional modifications may be made without departing from the scope of the following claims to which it should be accorded the broadest reasonable interpretation.

What is claimed is:

1. An imaging modality configured to record data onto removable storage media, comprising:
an image receiving interface configured to receive imaging data from an imaging sensor;
a central processing unit configured to process the imaging data to generate a study in a standard medical imaging format, and to transmit the study in the standard medical imaging format;
a removable media interface operatively connected to the central processing unit and configured to receive the study from the central processing unit,
wherein the removable media interface is directly connected to the central processing unit of the imaging modality such that the central processing unit of the imaging modality controls the removable media interface to automatically start a storage operation to record the study generated by the central processing unit onto the removable storage media, and
wherein the central processing unit transmits the study to the removable media interface using a localhost address and without the use of a physical network between the imaging modality and the removable media interface.

2. The imaging modality according to claim 1, wherein the removable media interface receives the study from the central processing unit via the localhost address.

3. The imaging modality according to claim 1, wherein the localhost address defines a local IP (internet protocol) address assigned to the removable media interface within the imaging modality.

4. The imaging modality according to claim 1, wherein the standard medical imaging format is DICOM (Digital Imaging and Communications in Medicine),
wherein the removable media interface receives the study under a DICOM protocol, and
wherein the central processing unit controls the removable media interface to records the study onto the removable storage media in the DICOM format.

5. The imaging modality according to claim 1, wherein the central processing unit further transmits to the removable media interface a viewer program without the use of a physical network between the imaging modality and removable media interface, and
wherein the central processing unit controls the removable media interface to record the viewer program onto the removable storage media together with the study.

6. The imaging modality according to claim 1, wherein the imaging modality is a mobile medical imaging modality, and
wherein the central processing unit is a computer that controls the medical imaging modality and the removable media interface.

7. The imaging modality according to claim 1, wherein the removable media interface includes one of an optical media writer and a USB (universal serial bus) host controller, and
wherein the central processing unit of the imaging modality controls the optical media writer to record the study in a CD (compact disc) or a DVD (digital versatile disc), or controls the USB host controller to store the study in a USB mass storage device.

8. A method of recording data from an imaging modality onto removable storage media, the imaging modality including a central processing unit operatively connected to a removable media interface, the method comprising:
receiving imaging data from an imaging sensor at an image receiving interface of the imaging modality;
processing, using the central processing unit of the imaging modality, the imaging data to generate a study in a standard medical imaging format;
transmitting the study in the standard medical imaging format from the central processing unit to the removable media interface via a localhost address and without the use of a physical network between the imaging modality and the removable media interface; and controlling, using the central processing unit of the imaging modality, the removable media interface to automatically start a storage operation to record the study generated by the central processing unit onto the removable storage media.

9. The method according to claim 8, further comprising receiving the study at the removable media interface via the localhost address.

10. The method according to claim 9, wherein receiving the study at the removable media interface includes receiving the study internally within the imaging modality without transmitting the study outside of the imaging modality.

11. The method according to claim 9, wherein the localhost address defines a local IP (internet protocol) address assigned to the removable media interface within the imaging modality.

12. The method according to claim 9, wherein the standard medical format is DICOM (Digital Imaging and Communications in Medicine),
wherein the removable media interface receives the study under a DICOM protocol, and
wherein the storage operation includes recording the study onto the removable storage media in the DICOM format.

13. The method according to claim 8, further comprising transmitting from the central processing unit to the removable media interface a viewer program,
wherein the storage operation includes recording the viewer program together with the study onto the removable storage media.

14. The method according to claim 8, wherein the removable media interface includes one of an optical media writer and a USB (universal serial bus) host controller, and
wherein controlling the removable media interface includes controlling the optical media writer to record the study in a CD (compact disc) or a DVD (digital versatile disc), or controlling the USB host controller to store the study in a USB mass storage device.

15. A non-transitory computer-readable medium storing thereon a computer-executable program which when executed by an imaging modality's computer is configured to record data from the imaging modality onto removable storage media, the imaging modality including a central processing unit operatively connected to a removable media interface, the program including instructions to perform a process comprising:

receiving imaging data from an imaging sensor at an image receiving interface of the imaging modality;
processing, using the central processing unit of the imaging modality, the imaging data to generate a study in a standard medical imaging format;
transmitting the study in the standard imaging format from the central processing unit to removable media interface via a localhost address and without the use of a physical network between the imaging modality and the removable media interface; and
controlling, using the central processing unit of the imaging modality, the removable media interface to automatically start a storage operation to record the study generated by the central processing unit onto the removable storage media.

16. The computer-readable medium according to claim 15, wherein local host address defines a local IP (Internet Protocol) address assigned to the removable media interface within the imaging modality.

17. The computer-readable medium according to claim 16, wherein receiving the study at the removable media via interface includes receiving the study via a localhost address without transmitting the study outside of the imaging modality.

18. The computer-readable medium according to claim 15, wherein the standard medical format is DICOM (Digital Imaging and Communications in Medicine),
wherein transmitting to the removable media interface includes transmitting the study under a DICOM protocol, and
wherein controlling the removable media interface includes recording the study onto the removable storage media in the DICOM format.

19. The computer-readable medium according to claim 15, wherein the process further comprises transmitting to the removable media interface a viewer program,
wherein controlling the removable media interface includes recording the viewer program together with the study onto the removable storage media.

20. The computer-readable medium according to claim 15, wherein the removable media interface includes one of an optical media writer and a USB (universal serial bus) host controller,
wherein controlling the removable media interface includes controlling the optical media writer to record the study in a CD (compact disc) or a DVD (digital versatile disc), and controlling the USB host controller to store the study in a USB mass storage device.

* * * * *